United States Patent [19]

Blau et al.

[11] Patent Number: 5,052,882

[45] Date of Patent: Oct. 1, 1991

[54] APPARATUS AND METHOD FOR CONTROLLABLY POSITIONING FORKS OF A MATERIAL HANDLING VEHICLE

[75] Inventors: Andrew P. Blau, Richmond Heights, Ohio; Paul D. Grohsmeyer, Dunlap, Ill.; Joseph J. Harding; Darren L. Krahn, both of Mentor, Ohio

[73] Assignee: Caterpillar Industrial Inc., Mentor, Ohio

[21] Appl. No.: 601,618

[22] Filed: Oct. 24, 1990

Related U.S. Application Data

[63] Continuation of Ser. No. 445,214, Dec. 4, 1989, abandoned.

[51] Int. Cl.[5] .............................................. B65G 65/00

[52] U.S. Cl. .................................................... 414/667

[58] Field of Search ........................ 414/664, 667, 668

[56] References Cited

U.S. PATENT DOCUMENTS

| | | | |
|---|---|---|---|
| 2,886,197 | 5/1959 | Harris | 214/653 |
| 2,958,436 | 11/1960 | Skutle | 414/667 |
| 3,557,974 | 1/1971 | Ostrander | 214/16.4 |
| 3,589,535 | 6/1971 | Reading | 214/16.4 |
| 3,754,673 | 8/1973 | Barda | 414/667 |
| 4,331,417 | 5/1982 | Shearer, Jr. | 414/273 |
| 4,335,992 | 6/1982 | Reeves | 414/667 |
| 4,458,786 | 7/1984 | Lebre | 187/9 R |
| 4,520,443 | 5/1985 | Yuki et al. | 364/424 |
| 4,714,399 | 12/1987 | Olson | 414/621 |
| 4,751,983 | 6/1988 | Leskovec et al. | 187/9 R |
| 4,869,635 | 9/1989 | Krahn | 414/667 X |
| 4,902,190 | 2/1990 | House | 414/667 |

FOREIGN PATENT DOCUMENTS

| | | |
|---|---|---|
| 6219359 | 9/1982 | Japan . |
| 6219360 | 9/1982 | Japan . |
| 5320263 | 5/1985 | Japan . |

*Primary Examiner*—David A. Bucci
*Assistant Examiner*—Craig Slavin
*Attorney, Agent, or Firm*—James R. Yee

[57] ABSTRACT

An apparatus controllably moves the forks of a material handling vehicle in traverse directions relative to a carriage assembly. The carriage assembly includes fork position sensors which detect the transverse location of each fork. A controller receives signals from the position sensors and moves the forks to locations a preselected or calculated distance apart. Forktip sensors detect the opening in a load during movement of the forks. The controller receives signals from the forktip sensors and positions the forks such that they are disposable within the load opening. The apparatus is especially suitable for use on an Automatic Guided Vehicle (AGV).

20 Claims, 7 Drawing Sheets

APPARATUS AND METHOD FOR CONTROLLABLY POSITIONING FORKS OF A MATERIAL HANDLING VEHICLE

This is a file wrapper continuation of application Ser. No. 07/445,214, filed Dec. 4, 1989 abandoned.

TECHNICAL FIELD

This invention relates generally to an apparatus and method for controllably moving first and second forks of a material handling vehicle and more particularly to positioning each of the forks relative to a load opening.

BACKGROUND ART

In the field of material handling, flexibility is a key factor. Material handling vehicles receive, transport and place loads in a variety of applications. The loads are usually placed in tubs, pallets, containers, or the like for transportation. The vehicle is typically equipped with a pair of forks for disposal into a load opening.

The width of the load opening varies greatly depending on the type and size of the load and the application. The distance between the forks is restricted by the smallest width of the load opening of any load in the system. A vehicle in which the distance between the forks is variable is therefore desirable. A forklift truck for example, typically has forks which are hung on a carrier. That is, the forks are connected to a lift mast assembly such that they can be manually positioned depending on the width of the load opening. In U.S. Pat. No. 4,458,786 and U.S. Pat. No. 4,502,568 both issued to Charles J. P. Lebre, dated July 10, 1984 and Mar. 5, 1985, respectively, a forklift truck having a handle to vary the spacing of the forks is disclosed. However, this is a manual operation and furthermore, the forks must be moved simultaneously and the same distance.

Forklift trucks are also known to be equipped with fork spreaders. This apparatus allows the forks to be hydraulically or electrically controlled by an operator. In U.S Pat. No. 2,886,197 issued to D. A. Harris, dated May 12, 1959 a lift truck outfitted with a load clamp includes a hydraulic valve and hydraulic cylinders for moving the arms of the clamp thereby opening and closing the clamp. There is however no means for determining the exact position of the arms of the clamp other than by estimation by the vehicle operator. It is therefore difficult to position the forks the correct distance apart.

Automatic guided vehicles of the driverless type (AGV) may also be equipped with a lift mast assembly and forks. Increased flexibility is a characteristic keenly felt in these vehicles. AGV's are used to transport a great variety of loads and must therefore be able to adapt to a variety of loads and load openings. By limiting the fork width such that it is able to fit in the smallest load opening creates a problem. This makes the handling of wider loads, which typically are heavier, quite unstable. Since it is highly undesirable to add a manual operation to this otherwise operatorless vehicle, the need for a system for automatically sensing the position of each fork at any point during operation and for automatically positioning each fork relative to the load is even more critical.

The subject invention is directed at overcoming one or more of the problems as set forth above.

DISCLOSURE OF THE INVENTION

In one aspect of the present invention a material handling vehicle having a frame and a lift mast assembly, said lift mast assembly having a pair of spaced apart uprights connected to the frame, a carriage assembly having a first guide portion oriented transverse the uprights, said carriage assembly being connected to the uprights and movable along the uprights, first and second forks connected to the carriage assembly and movable relative the carriage assembly and transverse the uprights is provided. Sensors detect the forks' locations and deliver signals representative of their locations. A controller calculates the forks' location relative to the carriage assembly.

In another aspect of the invention a method for controllably moving first and second forks of a material handling vehicle for alignment with a load having a load opening, the load opening has spaced apart first and second elevational edges, comprises the steps of: positioning the first and second forks at preselected first and second initial positions, respectively; moving the first and second forks in respective transverse directions; sensing the first elevational edge of the load opening; sensing the second elevational edge of the load opening; sensing a location of the first fork in response to sensing the first elevational edge; sensing a location of the second fork in response to sensing the second elevational edge; stopping movement of said first fork at a preselected location relative to said first elevational edge; and stopping movement of said second fork at a preselected location relative to said second elevational edge, said second fork being positioned a distance from said first fork.

BEST MODE FOR CARRYING OUT THE INVENTION

Figure 1:
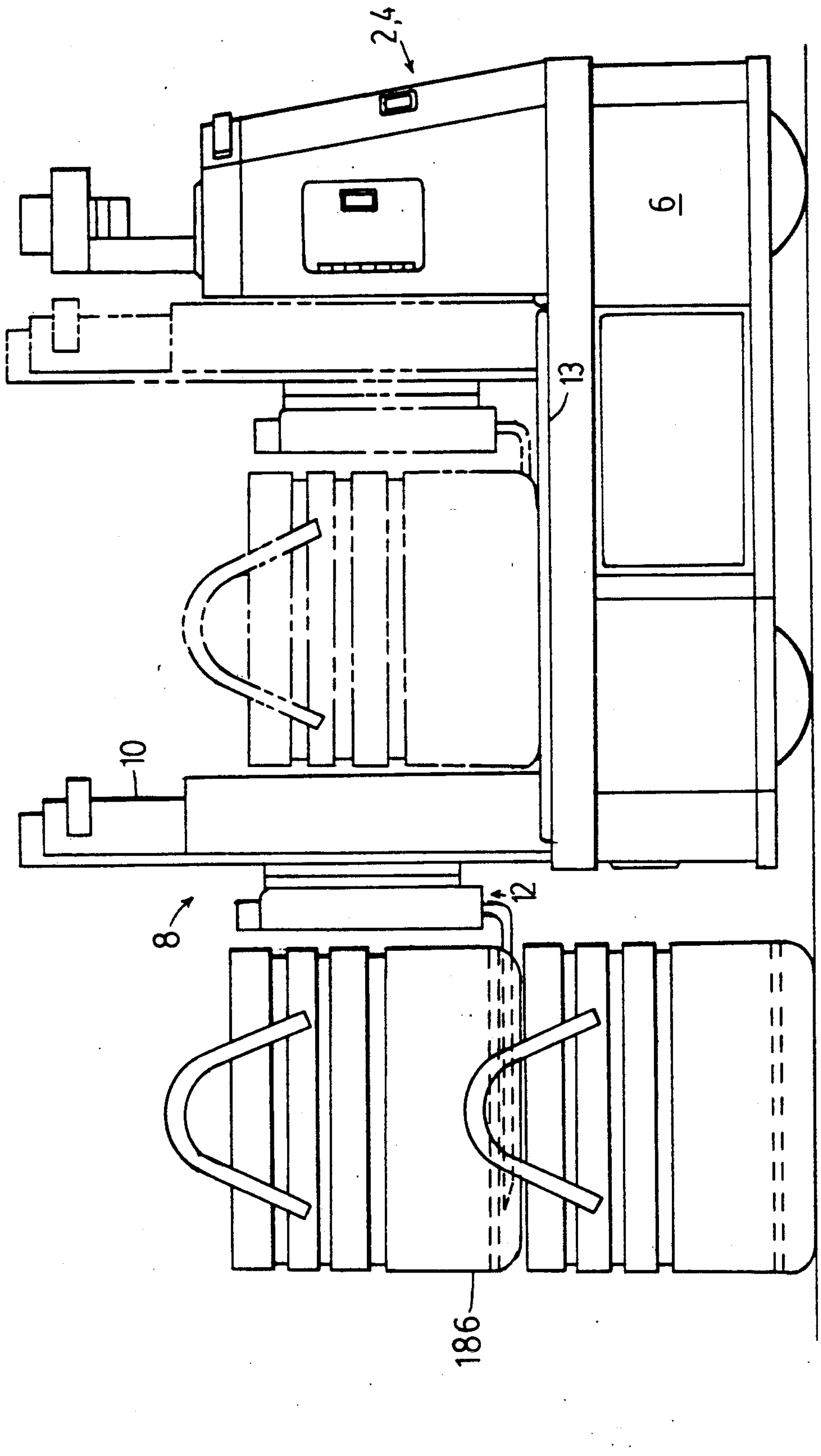
FIG. 1 is a diagrammatic side view of an automatic guided vehicle having a lift mast assembly showing the load at the transport position in phantom lines and in a loading sequence in the solid lines.

With reference to FIG. 1, the material handling vehicle 2 is preferably shown as an automatic guided vehicle 4 (known in the art as an AGV). The AGV 4 includes a frame 6 and a lift mast assembly 8 having a pair of spaced apart uprights 10 connected to the frame 6 and a carriage assembly 12 for engaging a load 186. The carriage assembly 12 moves along the uprights 10. The lift mast assembly 8 moves longitudinally relative to the AGV 4 along a deck 13. As shown in phantom lines, the lift mast assembly 8, including the carriage assembly 12 and the load 186 are placed on the deck 13 with an equal load distribution with reference to the longitudinal axis of the AGV 4 during transportation.

Figure 2:
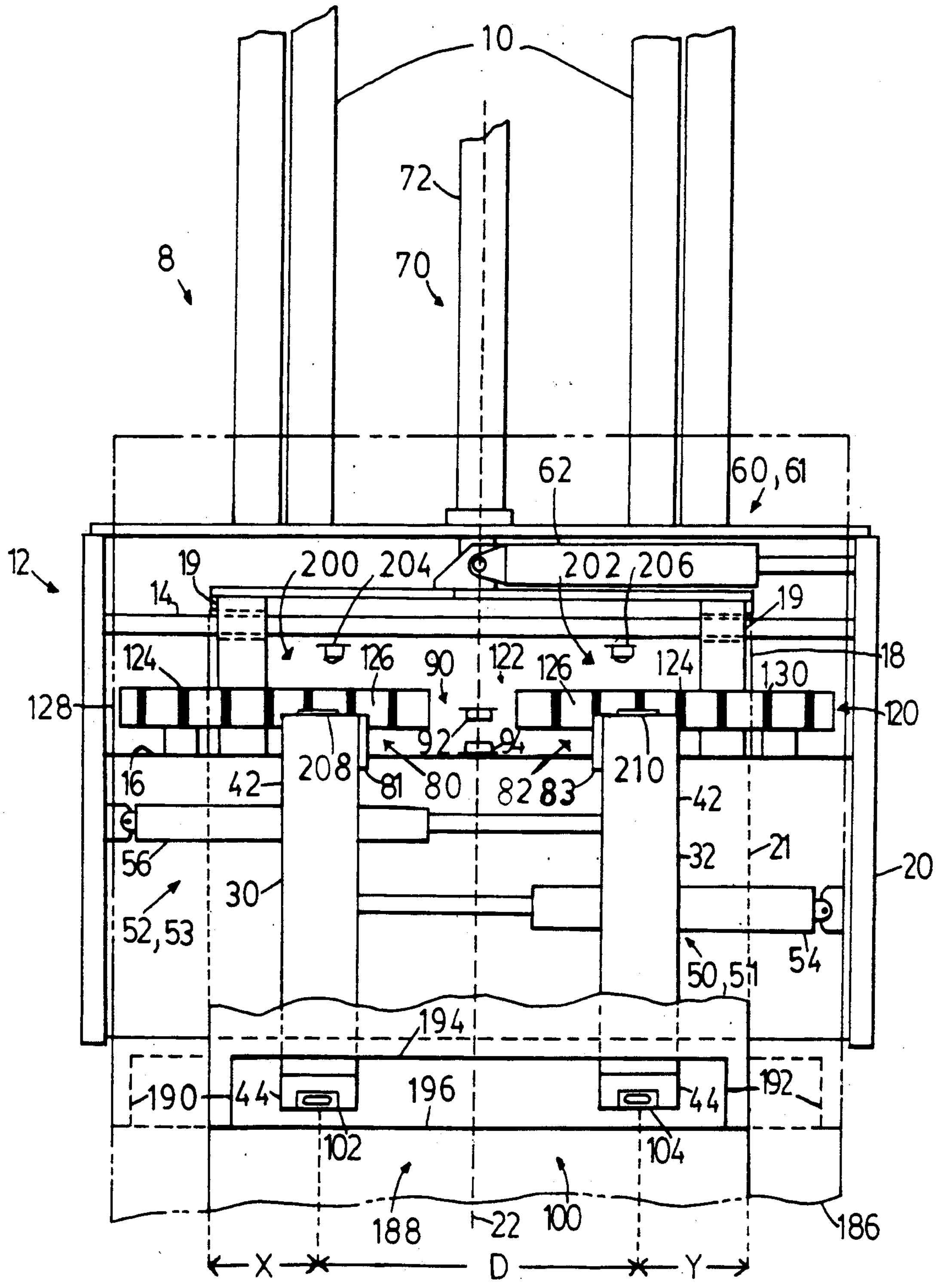
FIG. 2 is a diagrammatic partial front view of the lift mast assembly in FIG. 1.
Figures 3A, 3B:
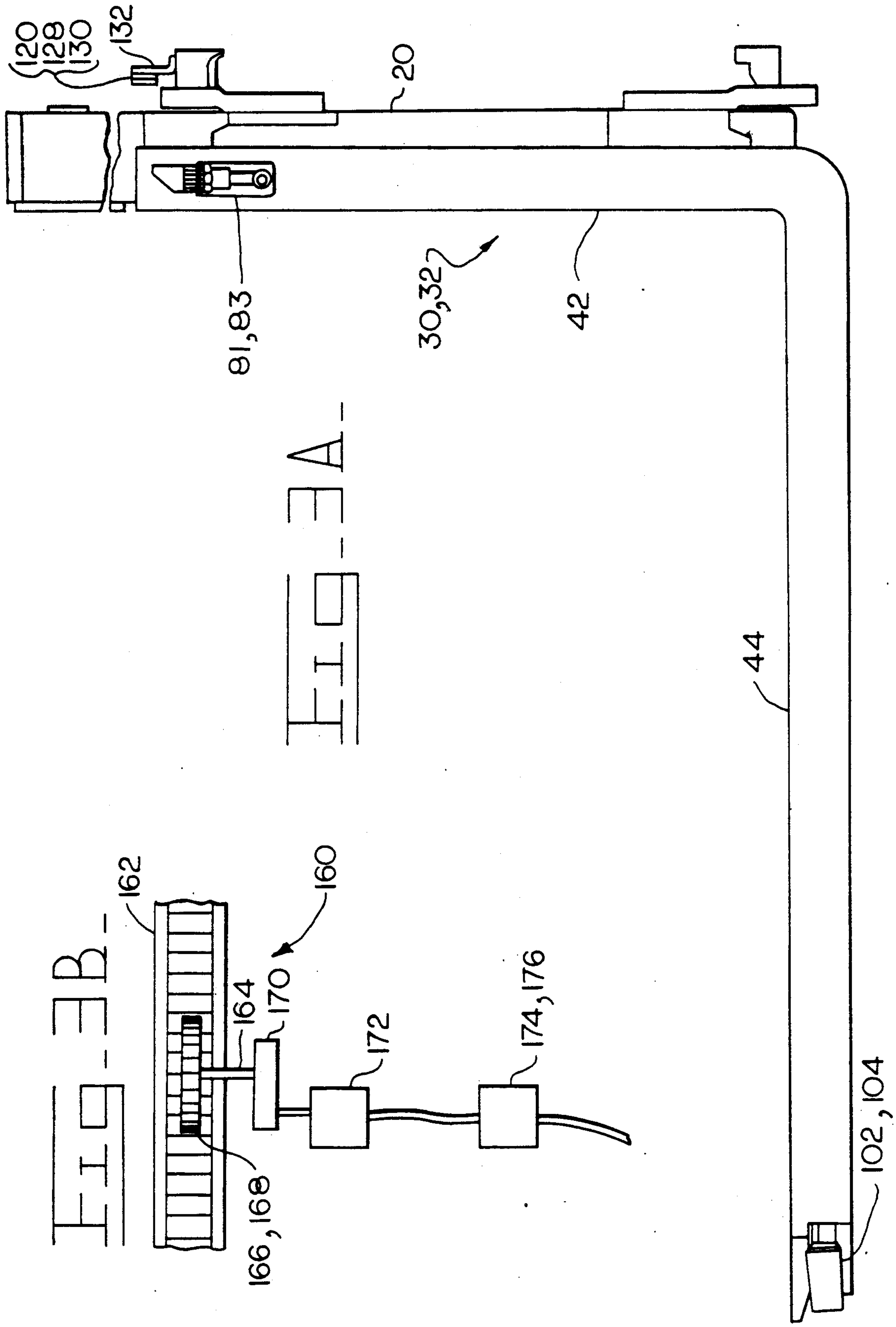
FIG. 3A is a diagrammatic side view of a fork showing the placement of a fork position sensor and a forktip sensor.
FIG. 3B illustrates an alternative embodiment of the first and second detecting means.

With reference to FIG. 2, the carriage assembly 12 includes a carriage 18 and a side shiftable frame 20 having support brackets 19 and connected to the carriage 18. The carriage 18 has a first guide portion 14 and a carriage frame 21. The first guide portion 14, preferably shown as a guide rod, is slidably disposed in apertures in the support brackets 19. The side shiftable frame 20 is movable relative to the carriage 18 in directions substantially transverse the uprights 10. First and second forks 30,32 are connected to the side shiftable frame 20 and are movable in directions along a second guide portion 16 on the side shiftable frame 20. As best seen in FIG. 3A, the first and second forks 30,32 include a shank 42 and a load engaging portion 44. The forks 30,32 are of the "hook" type and are hung from the side shiftable frame 20 in a conventional manner.

The load 186 has at least one load opening 188 defined by spaced apart first and second elevational (or vertical) edges 190,192 and spaced apart first and second transverse edges 194, 196.

An elevational carriage assembly drive system 70 controllably moves the carriage assembly 12 in elevational directions along the uprights 10. The elevational carriage assembly drive system 70 includes a chain and sheave assembly (not shown) and a hydraulic lift cylinder 72. The chain and sheave assembly is operatively connected to the carriage assembly 12, the uprights 10, and the hydraulic lift cylinder 72. The elevational drive system 70 moves the carriage assembly 14 along the uprights 10 in a conventional fashion. Such a drive system 70 is known in the art. Accordingly, no further description is provided herein.

Referring to FIGS. 2 and 3A, first and second detecting means 80,82 for sensing the location of the first and second forks 30,32, respectively, are shown. The first and second detecting means 80,82 are preferably shown as a bar code system 122. First and second elongated placards 128,130 are mounted on the side shiftable frame 20 using brackets 132 in a conventional manner. The placards 128,130 have a surface 126 with dark vertical marks 124 printed on the surface 126. Alternately, the placards 128,130 can be combined into a single elongated member 120. The surface 126 faces the shanks 42 of the first and second forks 30,32.

First and second position sensors 81,83 deliver electromagnetic radiation in the direction of the first and second placards 128,130. Electromagnetic radiation is absorbed by dark colored surfaces and reflected by light colored surfaces. When the delivered electromagnetic radiation from one of the position sensors 81,83 is directed towards the spaces between the marks 124 on the placards 128,130, the radiation is reflected back towards the same position sensor 80,82. The position sensor 81,83 detects the reflected electromagnetic radiation and delivers first and second electrical signals in response to the reflected electromagnetic radiation. The position sensor 81,83 "reads" the marks 124 on the placard 128,130 by outputting one of two voltage levels when electromagnetic radiation is detected and outputting the other voltage level when electromagnetic radiation is not detected. The controller 180 detects this transition in the output state of the sensors 81,83.

Alternatively, the marks 124 on the placards 128,120 are permanent magnets and the position sensors 80,82 are hall effect sensors (not shown). The hall effect sensors reads the marks 124 and undergoes a change in output state as a magnet is moved in close proximity.

Alternatively, the first and second detecting means 80,82 may include a resolver system 160 as shown in FIG. 3B. A ladder assembly 162 is mounted on the side shiftable frame 20 in any suitable manner, such as by threaded fasteners (not shown). For simplicity, only one detecting means 80,82 is shown. First and second toothed elements 166,168 are rotatably mounted on the forks 30,32. The toothed element 166,168 engages the ladder assembly 162 and rotates in response to movement of the fork 30,32. The rotary motion of the toothed element 166,168 is transferred to a resolver 174,176 via a shaft 164. The resolver 174,176 is known in the art in that it is excited by a constant frequency signal and delivers a pair of constant frequency signals which have a magnitude and phase relationship proportional to the angular position of the resolver 174,176. A gear box 170 may be connected intermediate the shaft 164 and the resolver 174,176, should a gearing change be desirable. The resolver 174,176 is electrically connected to a resolver-to-digital (R/D) converter 172. The R/D converter 172 accepts the frequency signals from the resolver 174,176 and produces a multi-bit digital signal correlative to the amount of shaft 164 rotation. The digital signal is indicative of the movement of the fork 30,32 and is supplied to the controller 180.

A third detecting means 90 senses the location of the side shiftable frame 20 with respect to the carriage 18 and delivers a third electrical signal in response to the side shiftable frame 20 being at a preselected transverse position. Preferably, the third detecting means 90 includes a transverse position sensor 91 having a hall effect sensor 92 and a permanent magnet 94. The hall effect 92 is mounted on the carriage frame 21 and the permanent magnet 94 is mounted on the side shiftable frame 20. As the side shiftable frame 20 moves with respect to the carriage 18, the permanent magnet 94 is moved relative to the hall effect sensor 92. The hall effect sensor 92 changes output state when the permanent magnet 94 is closely adjacent. The sensor's 92 change in output state as the magnet 94 is being moved past it is seen as a pulse. Preferably, the permanent magnet 94 is mounted on the centerline 22 of the side shiftable frame 20 and the hall effect sensor 92 is transversely aligned with the permanent magnet 94 to deliver the electrical third electrical signal in response to the side shiftable frame 20 being centered with respect to the carriage 18.

A fourth detecting means 100 senses the first and second elevational edges 190,192 of the load opening 188 and delivers fourth and fifth electrical signals in response to detecting the first and second vertical edges 190,192, respectively. Preferably, the fourth detecting means 100 includes first and second forktip sensors 102,104. The forktip sensors 102,104 are connected to the load engaging portions 44 of the respective first and second forks 30,32. The forktip sensors 102,104 deliver electromagnetic radiation in a direction away from the vehicle 2 and towards the load 186 and load opening 188, and detect a reflection of the radiation. The electromagnetic radiation is reflected in the presence of a suitable obstacle, such as the load 186. The first and second forktip sensors 102,104 deliver the fourth and fifth signals to the controller 180 in response to the change in state between detection of the reflected radiation and nondetection of the reflected radiation.

Fifth and sixth detecting means 200,202 sense the locations of the first and second forks 30,32 with respect to preselected first and second initial positions, respectively. Preferably, the first and second initial positions are closely adjacent one another and centered on the carriage assembly 12. Preferably, the detecting means 200,202 include first and second initial sensors 204,206. The first and second initial sensors 204,206 are mounted to the carriage 18 and deliver electromagnetic radiation towards the first and second forks 30,32, respectively. Preferably, the first and second initial sensors 204,206 are connected to the carriage assembly 12 above the respective fork 30,32. A first retroreflective strip 208 is connected to the first fork 30 and a second retroreflective strip 210 is connected to the second fork 32. The retroreflective strips 208,210 are placed and oriented to reflect the electromagnetic radiation in response to the first and second forks 30,32 being at the first and second initial positions, respectively. The first and second initial sensors 204,206 deliver first and second initial signals, respectively, in response to receiving the reflected radiation.

The carriage assembly 12 includes first and second driving means 50,52 for controllably and independently moving the first and second forks 30,32 in directions along the second guide portion 16. Preferably, the driving means 50,52 includes first and second drive systems 51,53 having first and second electrical actuators 54,56. The electrical actuators 54,56 are operated through a motor control system (not shown) in a conventional manner. The first drive system 51 moves the first fork 30 in a first transverse direction along the second guide portion 16 and in a second transverse direction along the second guide portion 16 in response to receiving sixth and seventh electrical signals from a controller 180. The second drive system 53 moves the second fork 32 in the first transverse direction and in the second transverse direction in response to receiving eighth and ninth electrical signals from the controller 180. Alternatively, hydraulic cylinders, for example may also be utilized for controllably moving the forks 30,32. The sixth, seventh, eighth, and ninth signals actuate solenoid operated hydraulic control valves for controlling the movement of said forks 30,32.

Third driving means 60 for controllably moving the side shiftable frame 20 along the first guide portion 14 is also provided. Preferably, the third driving means 60 includes a transverse carriage assembly drive system 61 and is part of a hydraulic system (not shown) including a hydraulic cylinder 62 mounted between the carriage 18 and the side shiftable frame 20.

Figure 4:
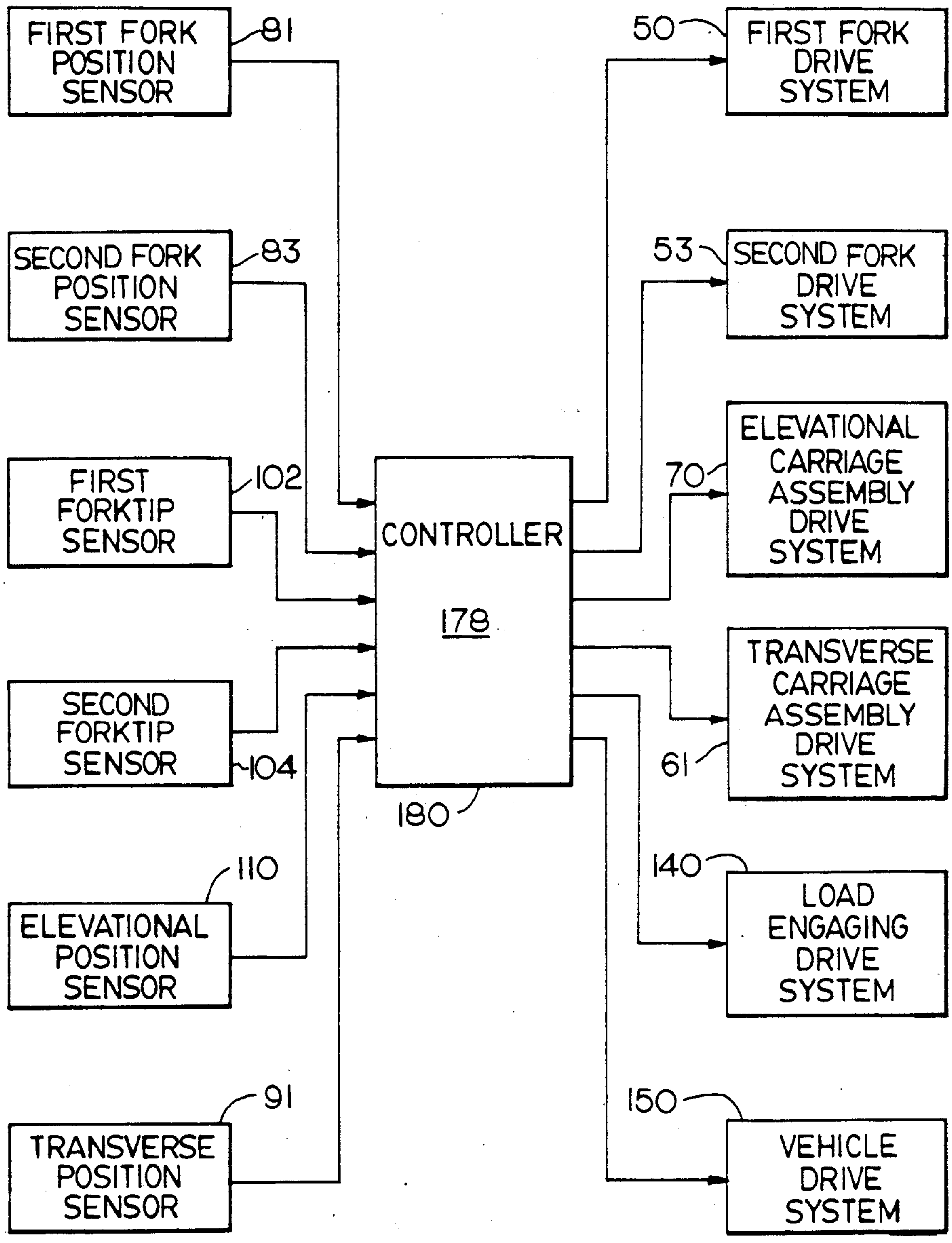
FIG. 4 is a block diagram of a portion of an embodiment of an electronic control system.

With reference to FIG. 4, the control system 178 includes the controller 180 under software control which receives the signals from the first and second fork position sensors 81,83, the first and second forktip sensors 102,104, the transverse position sensor 91 and an elevational position sensor 110 for sensing the location of the carriage 18 with respect to the uprights 10. Preferably, the elevational position sensor 110 includes a resolver system as described above.

The controlling means 180 is capable of controlling the elevational movement of the carriage assembly 12 and the transverse movement of the side shiftable frame 20, via the elevational carriage assembly drive system 70, the transverse carriage assembly drive system 61, a load engaging drive system 140 and a vehicle drive system 150. Detailed descriptions of the drive systems 70,61,140,150 are not presented herein since there exist many such system designs suitable for the intended purposes. The controlling means 180 includes a controller 178 and independently controls the movement of the first and second forks 30,32 through the first and second fork driving systems 50,52.

The controller 180 typically includes a microprocessor, static and dynamic memory. Since these are well known in the art of vehicle control a detailed description is not presented herein.

The controller 180 receives signals indicative of the elevational height of the carriage assembly 12, the transverse position of the side shiftable frame 20 and signals indicative of the presence or absence of the load 186. Using these signals, the controller 180 will proceed to position the forks 30,32 and the side shiftable frame 20 in suitable positions to engage the load 186 by searching for the load opening 188. Once positioned the controller 180 moves the forks 30,32 into the load opening 188. The controller 180 may control different portions of the AGV 4 to engage the load 186. For instance, the AGV 4 may remain stationary while the lift mast assembly 8 and the carriage assembly 12 mounted thereon moves relative to the longitudinal axis of the AGV 4 via the load engaging drive system 140. Alternatively, the vehicle drive system 150 moves the AGV 4 towards the load 186, moving the forks 30,32 into the load opening 188 thereby engaging the load 186.

Figure 5:
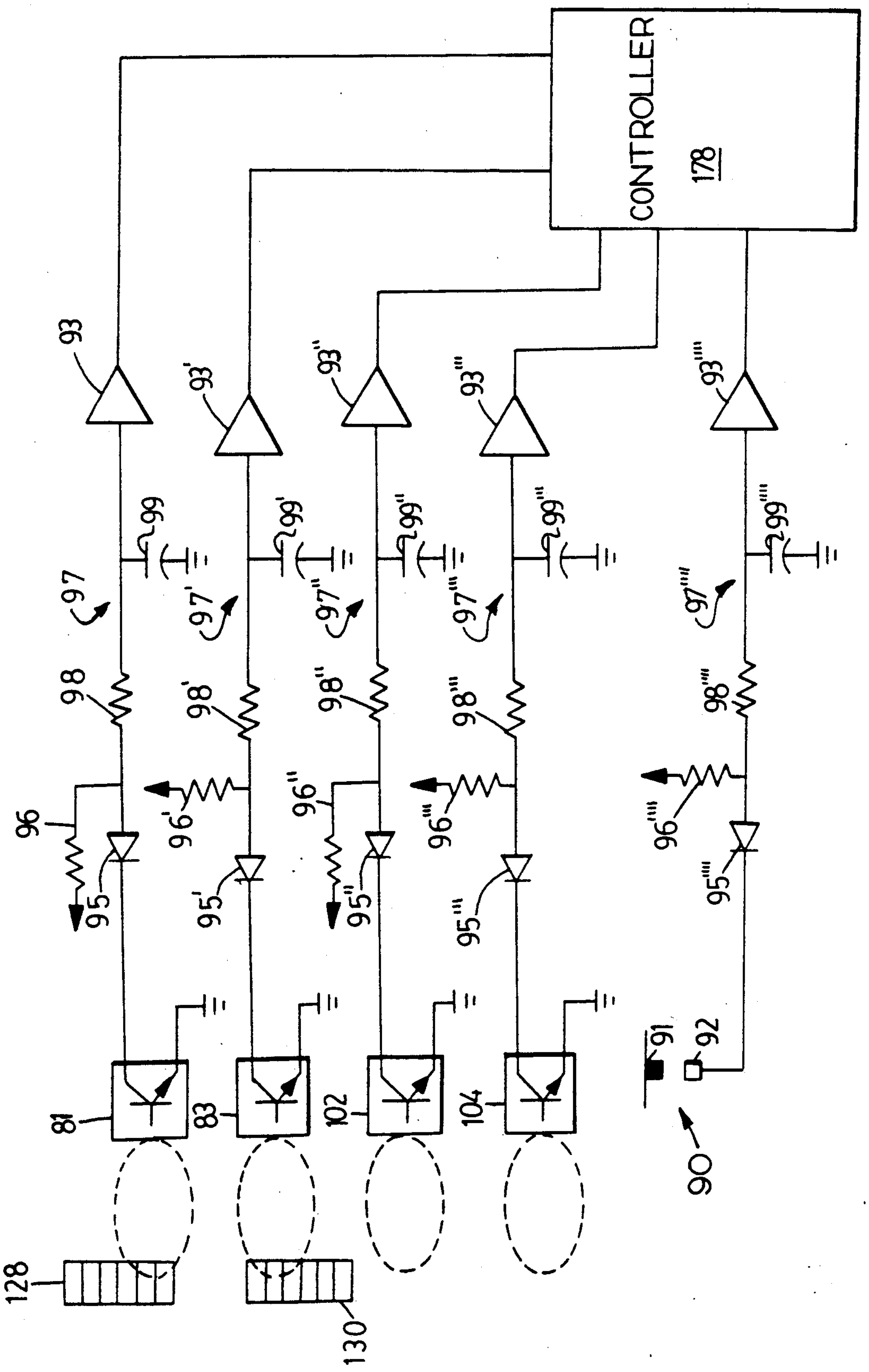
FIG. 5 is an electrical schematic of a portion of the embodiment of the control system in FIG. 4.

With reference to FIG. 5 the electrical connections between the sensors 81,83,102,104,91 and the controller 180 are shown. As can be seen the electrical connections between the sensors 81,83,102,104,91 and the controller 180 are identical. Thus discussion will be directed only towards the connection between the first fork position sensor 81 and the controller 180. However, the discussion holds for the remaining sensors 83,102,104,91 as well. Accordingly, like elements are similarly numbered. The output of the first position sensor 81 is connected to the cathode of a diode 95. The anode of the diode 95 is connected to a pull-up resistor 96 and a lowpass filter 97. The lowpass filter 97 includes a series resistor 98 and a capacitor 99. The series resistor 98 is connected to the anode of the diode 95 at one end and the capacitor 99 at the other end. The capacitor 99 is also connected to circuit ground. The lowpass filter 97 is connected to the controller 180 through an amplifier 93. The sensor 81 emits a pulse when the sensor 81 is moved past a mark 124 on the surface 126 of the placard 128. The lowpass filter 97 eliminates high frequency noise from the pulse and the amplifier 93 delivers an amplified pulse to the controller 180. The controller 180 detects the pulse and determines the location of the first fork 30 as a function of the pulse. The fork position sensors 81,83 and the forktip sensors 102,104 as illustrated have open collector outputs and can be purchased commercially. The transverse position sensor 91 includes a hall effect sensor 92 and a permanent magnet 94 as described previously. The hall effect sensor 92 emits a pulse when the permanent magnet 94 is moved past it. The controller 180 receives a filtered and amplified pulse as discussed above. The position of the side shiftable frame 20 is determined as a function of the pulse and the velocity of the transverse movement.

Figure 6:
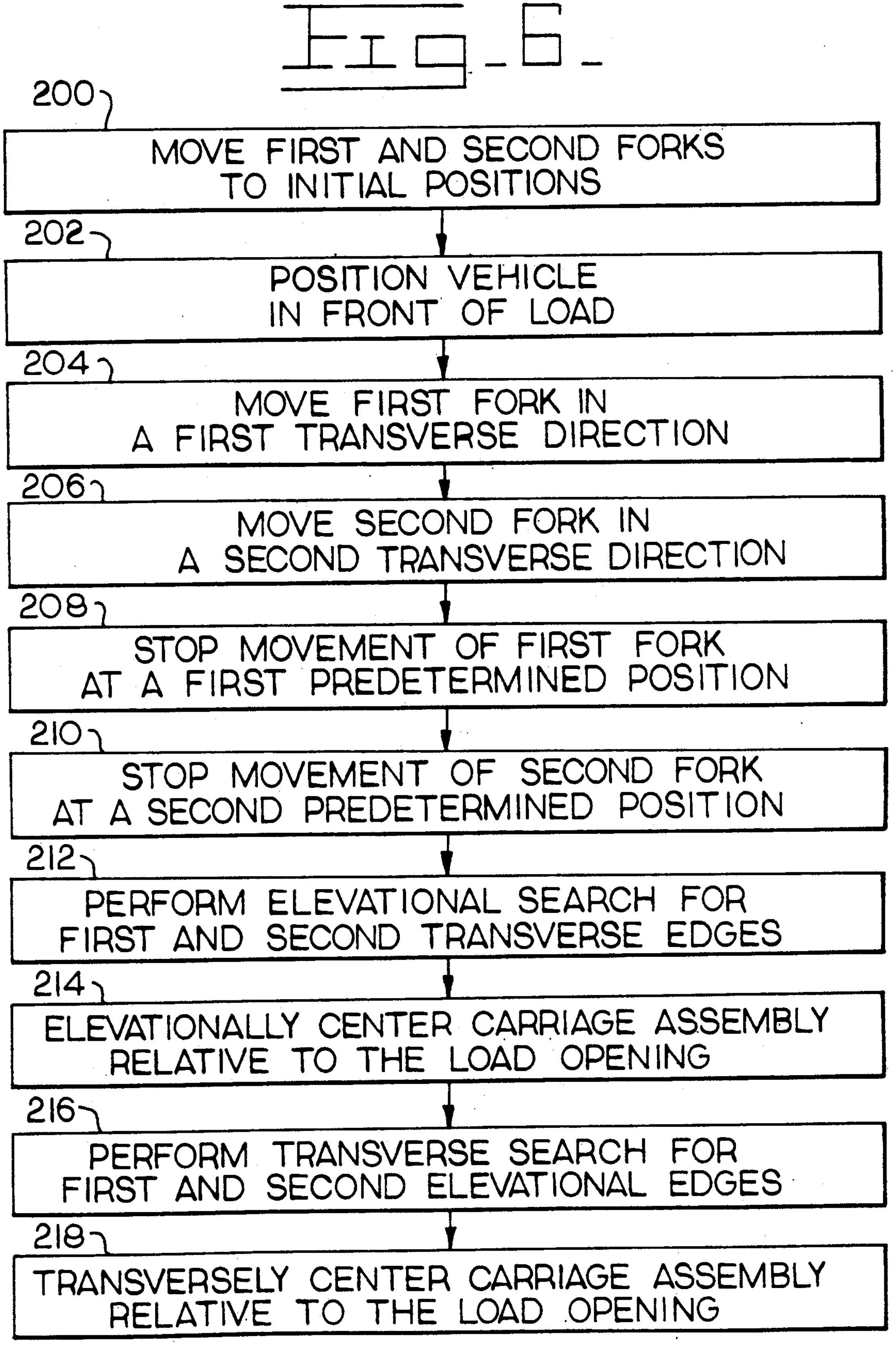
FIG. 6 is a block diagram of an embodiment of a portion of control software.

With reference to FIG. 6, a portion of one embodiment of the control software is described. The controller 180 is programmed with the path to be taken by the AGV 4 to its next load 186 and the type of load 186 to be transported. As shown in control block 200 the forks 30,32 are positioned at initial locations transversely centered on the side shiftable frame 20 and the side shiftable frame 20 is positioned at a transversely centered position on the carriage assembly 12. In control block 202, the controller 180 moves the AGV 4 to a position substantially in front of the load 186. The controller 180 moves the forks 30,32 in first and second transverse directions, as shown on control blocks 204 and 206, respectively. The fork position sensors 81,83 send pulses to the controller 180 in response to detecting the marks 124 on the placards 128,130 as the forks 30,32 are moved along the second guide portion 16. The controller 180 is programmed with the spacing between each mark 124 and the width of each mark 124. The controller 180 receives the pulses from the position sensors 80,82 and calculates the locations of the forks 30,32 relative to the side shiftable frame 20.

An associated distance between the first and second vertical edges 190,192, is programmed into the controller 180 corresponding to the type of load 186. Based on the distance between the first and second vertical edges 190,192 a desired distance, "D", between the first and second forks 30,32 is determined. The desired distance, "D", is suitable for the forks 30,32 to enter the load opening 188 and to lift the load 186. The locations of the first and second forks 30,32 are repeatedly calculated as the forks 30,32 move along the second guide portion 16. When the location of the first fork 30 reaches a value relative to the centerline 22 of the side shiftable carriage 20 substantially equal to half the desired distance, "D", its movement is stopped (control block 208). When the location of the second fork 32 reaches a value relative to the centerline 22 of the side shiftable carriage 20 substantially equal to half the desired distance, "D", in the other transverse direction, its movement is stopped (control block 210).

Thereafter, the side shiftable frame 20 is positioned in front of the load opening 188 such that the forks 30,32 are disposable within the load opening 188 as follows. First an elevational search is initiated in control block 212. The carriage assembly 12 including the side shiftable frame 20 and the first and second forks 30,32 is moved in a first elevational direction. When the first transverse edge 194 is detected by the forktip sensors 102,104 the carriage assembly 12 is stopped. Then the control system 178 determines the height of the first transverse edge 194 by sensing the location of the carriage assembly 12 with respect to the uprights 10. The carriage assembly 12 is then moved in a second transverse direction, and when the second transverse edge 196 is detected by the forktip sensors 102,104 the carriage assembly 12 is stopped. The control system 178 then determines the height of the second transverse edge 196 by sensing the location of the carriage assembly 12 with respect to the uprights 10. The heights of the first and second transverse edges 194,196 are averaged together to find a height of the approximate center of the load opening 188. In control block 214 the carriage assembly 12 is then elevationally positioned such that the forks 30,32 are at the elevational center of the load opening 188. A similar search is done in control block 216 to find the transverse center of the load opening 188. This is accomplished by moving the side shiftable frame 20 in first and second transverse directions and sensing the first and second vertical edges 190,192. The transverse center of the load opening 188 can then be calculated. The side shiftable frame 20 is then moved along the first guide portion 14 in control block 218 until the forks 30,32 are at the desired positions relative the load opening 188. Finally, the controller 180, using the load engaging drive means 140 and/or the vehicle drive system 150, moves the carriage assembly 12 to engage the load 186.

Figure 7:
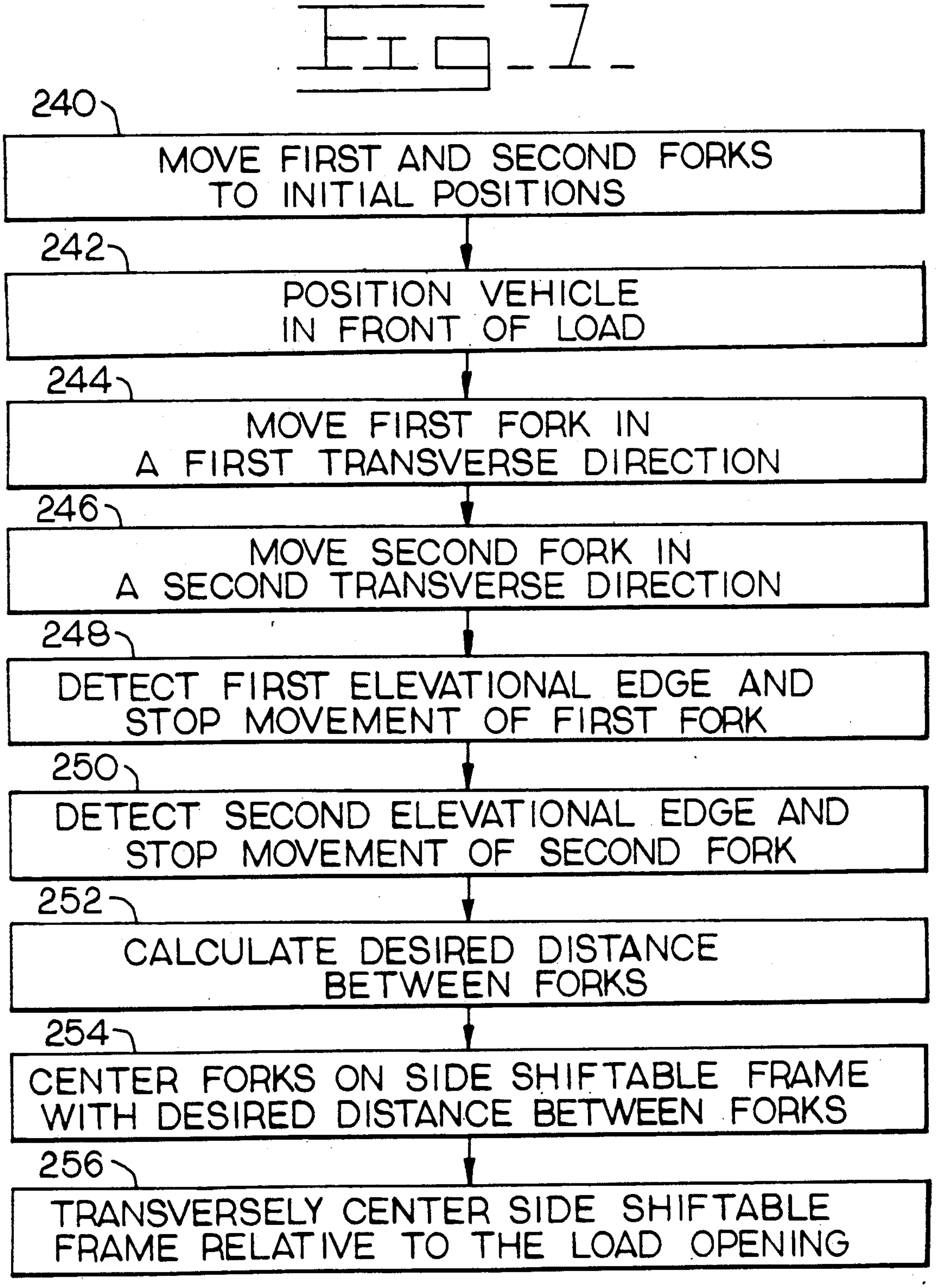
FIG. 7 is a block diagram of another embodiment of a portion of control software.

In another embodiment, the controller 180 has stored in its memory the path to be taken by the AGV 4. The controller 180, however, is not programmed with the type of load 188 Therefore, the forks 30,32 desired distance, "D", cannot be predetermined as described previously. Referring to FIG. 7, another embodiment of the control software is described. In control block 240, the first and second forks 30,32 are moved to initial positions. The initial positions are preferably such that the forks 30,32 are as close to the centerline 22 of the side shiftable frame 20 as allowed by the range of their movement. In control block 242 the AGV 4 is moved to a position substantially in front of the load 188. The first and second forks 30,32 are simultaneously moved in a first and second transverse direction (control blocks 244 and 246, respectively). When the first forktip sensor 102 detects the first vertical edge 190 of the load opening 188 in, control block 248, movement of the first fork 30 is halted. When the second forktip sensor 104 detects the second vertical edge 192 of the load opening 188, in control block 250, movement of the second fork 32 is halted. In control block 252, the controller 180 calculates the desired distance, "D", between the first and second forks 30,32 based on the locations of the first and second forks 30,32. The desired distance, "D" provides a predetermined distance, "X", between the first fork 30 and the first vertical edge 190 and a predetermined distance, "Y", between the second fork 32 and the second vertical edge 192 such that a clearance is provided between the vertical edges 190,192 and the forks 30,32. Next (control block 254), the forks 30,32 are moved to positions centered on the side shiftable frame 20 with the desired distance, "D", between the forks 30,32. The distance that each forks 30,32 is moved is stored by the controller 180. Using the stored distances and the calculated desired distance, "D", the side shiftable frame 20 is moved such that the frame 20 and the forks 30,32 are centered with respect to the load opening 188. Finally, the controller 180, using the load engaging drive means 140 and/or the vehicle drive system 150, moves the carriage assembly 12 to engage the load 186.

Industrial Applicability

With Reference to the drawings, and in operation, the AGV 4 is guided via the on board guidance system (not shown) towards a destination at which the AGV 4 is to pick up a load 186. The load 186 may be a tub, pallet, container, or the like. During travel, the lift mast assembly 8 is positioned on the deck 13 as shown in FIG. 1 in the phantom lines. The AGV 4 is maneuvered by the vehicle drive system 150 to a position approximately in front of the load 186.

The load engaging drive system 140 moves the lift mast assembly 8 along the AGV 4 on the deck 13 to the position shown in solid lines. The elevational carriage assembly drive system 70 moves the carriage assembly 12 along the uprights 10 to an estimated position in which the forks 30,32 are in front of the load opening 188.

The controller 180 is programmed with the type and the size of the load 186 to be transported. The type of load 186 has an associated load opening 188 defined by first and second elevational edges 190,192 and first and second transverse edges 194,196. The vertical edges 190,192 are set a fixed distance apart giving the load opening 188 a set width. The controller 180 is programmed to move the forks a set distance apart corresponding to the type of load 186.

The first and second forks 30,32 are moved in transverse directions towards the preselected first and second initial positions. The initial sensors 204,206 deliver electromagnetic radiation towards the forks 30,32, receive electromagnetic radiation reflected by the retroreflective strips 208,210 when the forks 30,32 are at the preselected positions and delivers first and second initial signals in response to receiving the reflected radiation. The controller 180 receives the initial signals and stops movement of the forks 30,32 at the first and second preselected positions, respectively.

From the initial positions, the forks 30,32 are moved outward in opposite directions. The fork position sensors 80,82 read the marks 124 on the surfaces 126 of the placards 128,130 and deliver signals to the controller 180. The controller 180, by being programmed with the spacing and dimensions of the marks 124, keeps track of the location of the forks 30,32 relative to the side shiftable frame 20. When the first fork 30 has half the desired distance between it and the centerline of the side shiftable frame 22, its movement is stopped. When the second fork 30 has half the desired distance between it and the centerline of the side shiftable frame 22, its movement is stopped.

The side shiftable frame 20 and the associated forks 30,32 (having the distance, "D", between them) is positioned such that the forks 30,32 are disposable within the load opening 188. Using the forktip sensors 102,104 an elevational search 212 is completed. The carriage assembly 12 is moved along the uprights 10. The forktip sensors 102,104 detect the transverse edges 194,196 and the controller 180 calculates the heights of the edges 194,196 through utilization of the elevational position sensor 110. The approximate height of the center of the load opening 188 is calculated by averaging the heights of the first and second transverse edges 194,196. The controller 180 then moves the carriage assembly 12 such that the forks are at the estimated height of the center of the load opening 188.

A similar search is done to find the transverse center of the load opening 188. The side shiftable frame 20 is moved along the first guide portion 14. The forktip sensors 102,104 detect the elevational edges 190,192 of the load opening 188. The locations of vertical edges 190,192 relative to the carriage 12 is calculated based on the time taken to move the forks between the center position and the first and second vertical edges 190,192. The transverse center of the load opening 188 is calculated by averaging the stored locations. The side shiftable frame 20 is moved to the transverse center.

The forks 30,32 are now centered on the side shiftable frame 20 and the side shiftable frame 20 is centered with respect to the load opening 188. The controller 180 commands the load engaging drive system 140 to move the lift mast assembly 8 towards the load opening 188 thereby engaging the load 186. Once the forks 30,32 are completely in the load opening 188 the controller 180 commands the elevational carriage assembly drive system 70 to move the carriage assembly 12 in an upward direction along the uprights 10, thereby lifting the load 186. Once the load 186 is elevated to a preselected elevational position, movement of the carriage assembly 12 is stopped. Next the side shiftable frame 20 is transversely centered with respect to the carriage 18 so as to eliminate any adverse side loading and improper load distribution relative to the center of gravity of the AGV 4.

The carriage assembly 12 and the load 186 are then lifted and placed on the deck 13 for transportation by the elevational carriage assembly drive system 70 and load engaging drive system 140.

In the alternate embodiment, the type and the size of the load 186 to be transported is not programmed into the controller 180. Therefore, the desired distance, "D", between the forks 30,32 is unknown. The desired distance, "D", is calculated through the utilization of the first and second forktip sensors 102,104. The first fork 30 is moved in the first transverse direction relative to the side shiftable, frame 20 and is stopped when the first vertical edge 190 is detected. The second fork 32 is moved in the second transverse direction relative to the side shiftable frame 20 and is stopped when the second vertical edge 192 is detected. The forks 30,32 are now positioned in front of the first and second vertical edges 190,192, respectively.

To ensure proper loading and to relieve the AGV 4 of improper load distribution, the forks 30,32 must be centered with respect to the side shiftable frame 20 and the side shiftable frame 20 must be centered with respect to the load opening 188. First, the desired distance, "D", between the forks 30,32 allowing a set distance between the first and second forks 30,32 and the respective vertical edge 190,192 is calculated.

The controller 180 receives signals indicative of the position of the first and second forks 30,32 relative to the elevational edges 190,192 of the load opening 188, the position of the first and second forks 30,32 relative to the side shiftable frame 20, and the position of the side shiftable frame 20 with respect to the carriage 18. The offset distance that the side shiftable frame 20 must be moved such that the frame 20 and the forks 30,32 are centered with respect to the load opening 188 can be calculated. With the forks 30,32 centered on the frame 20, the frame 20 and the forks 30,32 are then moved the offset distance. The load 186 can now be lifted and transported as above.

I claim:

1. A material handling vehicle having a frame and a lift mast assembly, said lift mast assembly having a pair of spaced apart uprights connected to the frame, a carriage assembly including a carriage having a first guide portion oriented transverse to the uprights, said carriage assembly including a side shiftable frame having a second guide portion oriented substantially parallel with said first guide portion, said side shiftable frame being connected to the carriage and movable along the first guide portion, said carriage assembly being connected to the uprights and movable along the uprights, said carriage assembly includes a carriage having first and second forks, said carriage being connected to the carriage assembly and movable relative to the carriage assembly and transverse to the uprights, said first and second forks each having a shank and a load engaging portion, said load engaging portions extending in a direction generally away from the material handling vehicle, and said shanks being connected to the second guide portion, comprising:

first detecting means for sensing a location of the first fork and producing a first signal in response to said location of the first fork, said first detecting means includes an elongated member having a surface and plurality of distinguishable spaced apart marks arranged along the surface, said elongated member being substantially parallel to said first guide portion and being connected to both the carriage assembly and said surface facing the first and second shanks;

second detecting means for sensing a location of the second fork and producing a second signal in response to said location of the second fork, said second detecting means includes said elongated member;

controlling means for receiving the first signal and responsively producing a first movement signal and for receiving the second signal and responsively producing a second movement signal;

first driving means for controllably moving the first fork relative to the carriage assembly in response to said first movement signal, said first driving means being connected to and between the side shiftable frame and the first shank;

second driving means for controllably moving the second fork relative to the carriage assembly in response to said second movement signal, said second driving means being connected to and between the side shiftable frame and the second shank; and said first detecting means being adapted to deliver electromagnetic radiation in the direction of the surface of said elongated member, receive a reflection of the electromagnetic radiation and deliver said first signal in response to receiving the reflection of the electromagnetic radiation, said second detecting means being adapted to deliver electromagnetic radiation in the direction of the surface of said elongated member, receive a reflection of the electromagnetic radiation and deliver said second signal in response to receiving the reflection of the electromagnetic radiation, the first and second detecting means being connected to the first and second forks, respectively and being movable along the second guide portion in response to movement of the first and second forks, respectively.

2. A material handling vehicle, as set forth in claim 1, wherein said elongated member includes first and second placards, said placards being connected to the side shiftable frame.

3. A material handling vehicle having a frame and a lift mast assembly, said lift mast assembly having a pair of spaced apart uprights connected to the frame, a carriage assembly having a first guide portion oriented transverse to the uprights, said carriage assembly being connected to the uprights and movable along the uprights, first and second forks connected to the carriage assembly and movable relative to the carriage assembly and transverse to the uprights, comprising:

first detecting means for sensing a location of the first fork and producing a first signal in response to said location of the first fork, said first detecting means including an elongated member having a surface and a plurality of distinguishable spaced apart marks arranged along the surface, said elongated member being substantially parallel to said first guide portion and being connected to the carriage assembly, said surface facing said first and second forks;

second detecting means for sensing a location of the second fork and producing a second signal in response to said location of the second fork, said second detecting means including said elongated member;

controlling means for receiving the first signal and responsively producing a first movement signal, and for receiving the second signal and responsively producing a second movement signal;

first driving means for controllably moving the first fork relative to the carriage assembly in response to said first movement signal;

second driving means for controllably moving the second fork relative to the carriage assemlby in response to said second movement signal; and said first detecting means being adapted to deliver electromagnetic radiation in the direction of the surface of said elongated member, receive a reflection of the electromagnetic radiation and deliver said first signal in response to receiving the reflection of the electromagnetic radiation, said second detecting means being adapted to deliver electromagnetic radiation in the direction of the surface of said elongated member, receive a reflection of the electromagnetic radiation and deliver said second signal in response to receiving the reflection of the electromagnetic radiation, the first and second detecting means being connected to the first and second forks, respectively and being movable along the second guide portion in response to movement of the first and second forks, respectively.

4. A material handling vehicle, as set forth in claim 3, wherein said elongated member includes first and second placards, said placards being connected to the carriage assembly.

5. A material handling vehicle, as set forth in claim 1, including:

third driving means for controllably moving the side shiftable frame along the first guide edge;

third detecting means for sensing a location of the side shiftable frame with respect to the carriage and delivering a third signal in response to said side shiftable frame being at a preselected transverse position;

fourth detecting means for sensing first and second elevational edges of a load opening and delivering fourth and fifth signals in response to sensing said first and second elevational edges, respectively.

said controlling means including a programmable microcomputer and software means for receiving the fourth and fifth signals, delivering sixth and seventh signals, stopping movement of said first fork in response to receiving said fourth signal, stopping movement of said second fork in response to receiving said fifth signal, calculating first and second load engaging locations of the first and second forks, respectively, said first and second load engaging locations being substantially centered on said side shiftable frame and enabling said first and second forks to enter said load opening, delivering eighth and ninth signals, stopping movement of said first and second forks at the first and second load engaging locations, respectively, receiving said third signal, calculating a location of the side shiftable frame relative said load opening, said calculated location being substantially aligned with said load opening, and moving the side shiftable frame to the calculated position; and, wherein said first driving means being adapted to move the first fork in a first transverse direction in response to receiving said sixth signal and to move the first fork in a second transverse direction in response to receiving said eighth signal, said second driving means being adapted to move the second fork in said first transverse direction in response to receiving said ninth signal and to move the second fork in said second transverse direction in response to receiving said seventh signal.

6. A material handling vehicle, as set forth in claim 3, wherein said first driving means being adapted to move the first fork in a first transverse direction in response to receiving a sixth signal and to move the first fork in a second transverse direction in response to receiving a seventh signal, said second driving means being adapted to move the second fork in said first transverse direction in response to receiving a eighth signal and to move the second fork in said second transverse direction in response to receiving a ninth signal, said controlling means includes a programmable microcomputer and software means for initializing first and second variables representative of first and second fork initial positions, delivering said sixth signal and adding a first preselected value to the first variable in response to receiving said first signal, delivering said seventh signal and adding a second preselected value to the first variable in response to receiving said first signal, delivering said eighth signal and adding a third preselected value to the second variable in response to receiving said second signal, delivering said ninth signal and adding a fourth preselected value to the second variable in response to receiving said second signal, stopping movement of said first fork in response to said first variable being equal to a fifth preselected value, and stopping movement of said second fork in response to said second variable being equal to a sixth preselected value.

7. A material handling vehicle having a frame and a lift mast assembly, said lift mast assembly having a pair of spaced apart uprights connected to the frame, a carriage assembly having a first guide portion oriented transverse to the uprights, said carriage assembly being connected to the uprights and movable along the uprights, first and second forks connected to the carriage assembly and movable relative to the carriage assembly and transverse to the uprights, comprising:

first detecting means for sensing a location of the first fork and producing a first signal in response to said location of the first fork;

second detecting means for sensing a location of the second fork and producing a second signal in response to said location of the second fork;

controlling means for receiving the first signal and responsively producing a first movement signal, and for receiving the second signal and responsively producing a second movement signal;

first driving means for controllably moving the first fork relative to the carriage assembly in response to said first movement signal;

second driving means for controllably moving the second fork relative to the carriage assembly in response to said second movement signal;

fifth detecting means for sensing a first preselected initial position and delivering a first initial signal in response to said first fork being at said first preselected initial position;

sixth detecting means for sensing a second preselected initial position and delivering a second initial signal in response to said second fork being at said second preselected initial position, said controlling means being adapted to receive said first and second initial signals and to stop said movement of said first and second forks in response to receiving said signals; and said fifth and sixth detecting means include first and second initial sensors connected to the carriage assembly and first and second retroreflective strips connected to the first and second forks, respectively, said first and second initial sensors being adapted to deliver electromagnetic radiation in the direction of said first and second retroreflective strips, respectively, receive a reflection of said electromagnetic radiation, and deliver said first and second initial signal in response to receiving said electromagnetic radiation reflection.

8. An automatic guided vehicle having a frame and a lift mast assembly, said lift mast assembly having a pair of spaced apart uprights connected to the frame, a carriage assembly having a carriage having a first guide portion oriented transverse to the upright and a side shiftable frame having a second guide portion oriented substantially parallel with said first guide portion, said side shiftable frame being connected to the carriage and movable along the first guide portion, said carriage being connected to the uprights and movable along the uprights, first and second forks each having a shank and a load engaging portion extending in a direction generally away from the material handling vehicle, and said shanks being connected to the second guide portion and said first and second forks being movable relative to the carriage assembly along the second guide portion, comprising:

a first elongated placard having a surface and a plurality of distinguishable spaced apart marks arranged along the surface and being connected to the side shiftable frame, said surface facing the shank of said first fork and substantially parallel to said second guide portion;

a second elongated placard having a surface and a plurality of distinguishable spaced apart marks arranged along the surface and being connected to the side shiftable frame, said surface facing the shank of said first fork and substantially parallel to said second guide portion;

first detecting means for delivering electromagnetic radiation in the direction of the surface of said first elongated member, receiving a reflection of the electromagnetic radiation and delivering a first signal in response to receiving the reflection of the electromagnetic radiation, said first detecting means being connected to the first fork and movable along the second guide portion in response to movement of the first fork;

second detecting means for delivering electromagnetic radiation in the direction of the surface of said second elongated member, receiving a reflection of the electromagnetic radiation and delivering a second signal in response to receiving the reflection of the electromagnetic radiation, said second detecting means being connected to the second fork and movable along the second guide portion in response to movement of the second fork;

third detecting means for sensing a location of the side shiftable frame with respect to the carriage and delivering a third signal in response to said side shiftable frame being at a preselected transverse position;

fourth detecting means for sensing first and second elevational edges of a load opening and delivering fourth and fifth signals in response to sensing said first and second elevational edges, respectively;

first driving means for controllably moving the first fork in a first transverse direction relative to the carriage assembly in response to receiving a seventh signal and to move the first fork in a second transverse direction relative to the carriage assembly in response to receiving an eighth signal;

second driving means for controllably moving the second fork in said first transverse direction in response to receiving a ninth signal and to move the second fork in said second transverse direction in response to receiving a tenth signal;

third driving means for controllably moving the side shiftable frame along the first guide edge;

controlling means for receiving the first and third signals and calculating the location of the first fork relative to the carriage assembly, receiving the second signal and calculating the location of the second fork relative to the carriage assembly, receiving the fourth and fifth signals, delivering a sixth and said ninth signals, stopping movement of said first fork in response to receiving said fourth signal, stopping movement of said second fork in response to receiving said fifth signal, calculating first and second load engaging locations of the first and second forks, respectively, said first and second load engaging locations being substantially centered on said side shiftable frame and enabling said first and second forks to enter said load opening, delivering said seventh, eighth,. ninth, and tenth signals, stopping movement of said first and second forks at the first and second load engaging locations, respectively, calculating a location of the side shiftable frame relative said load opening in response to said third signal, said calculated location being substantially aligned with said load opening, and aligning said side shiftable frame with said load opening.

9. An automatic guided vehicle, as set forth in claim 8, including:

fifth detecting means for sensing a first preselected initial position and delivering a first initial signal in response to said first fork being at said first preselected initial position;

sixth detecting means for sensing a second preselected initial position and delivering a second initial signal in response to said second fork being at said second preselected initial position, said controlling means being adapted to receive said first and second initial signals and to stop said movement of said first and second forks in response to receiving said signals.

10. An automatic guided vehicle, as set forth in claim 9, wherein said fifth and sixth detecting means includes first and second initial sensors connected to the carriage assembly and first and second retroreflective strips connected to the first and second forks, respectively, said first and second initial sensors being adapted to deliver electromagnetic radiation in the direction of said first and second retroreflective strips, respectively, receive a reflection of said electromagnetic radiation, and deliver said first and second initial signals in response to receiving said electromagnetic radiation reflection.

11. A method for controllably moving first and second forks of a material handling vehicle into alignment with a load having a load opening, said forks having forktip sensors and fork position sensors, said load opening having a centerline and first and second vertical edges spaced substantially equal distances from said centerline, wherein the material handling vehicle includes a pair of uprights, a side shiftable frame movable transverse the uprights, and a microcomputer, comprising:

positioning the first and second forks at preselected first and second initial positions, respectively;

moving the first and second forks in respective transverse directions;

producing first and second position signals in response to sensing the location of the first and second forks, respectively;

producing a first edge signal in response to sensing the first vertical edge of the load opening;

producing a second edge signal in response to sensing the second vertical edge of the load opening;

calculating a location, "X", in response to said first edge signal and said first position signal;

calculating a location, "Y", in response to said second edge signal and said second position signal;

positioning said first and second forks in said locations, "X" and "Y", respectively;

sensing a location of the side shiftable frame with respect to the material handling vehicle; and, calculating a location of the centerline of the side shiftable frame relative to at least one of the sensed vertical edges.

12. A method, as set forth in claim 11, wherein the step of moving the first and second forks in respective transverse directions includes the step of positioning said forks in preselected locations, relative to the centerline and having a distance, D, between said forks at said preselected locations.

13. A method, as set forth in claim 12, wherein said forks are connected to a side shiftable frame including the step of transversely moving said side shiftable frame and associated forks to a position at which said first fork is at location, "X", and said second fork is at location, "Y".

14. A material handling vehicle having a frame and a lift mast assembly, said lift mast assembly having a pair of spaced apart uprights connected to the frame, a carriage assembly connected to the uprights and movable along the uprights, first and second forks connected to the carriage assembly and movable relative to the carriage assembly transverse the uprights, comprising:

first detecting means for sensing a transverse location of the first fork relative to the carriage assembly and producing a first signal in response to said location of the first fork;

second detecting means for sensing a transverse location of the second fork relative to the carriage assembly and producing a second signal in response to said location of the second fork;

controlling means for receiving the first and second signals, processing the first and second signals in accordance with a set of preprogrammed instructions, and responsively producing first and second movement signals;

first driving means for receiving said first movement signal and responsively moving the first fork to a predetermined position relative to said carriage assembly as set forth by said preprogrammed instructions; and second driving means for receiving said second movement signal and responsively moving the second fork to a predetermined position relative to said carriage assembly as set forth by said preprogrammed instructions.

15. A material handling vehicle, as set forth in claim 14, wherein said first and second detecting means include a bar code system.

16. A material handling vehicle, as set forth in claim 14, wherein said first and second detecting means include a resolver system.

17. A material handling vehicle, as set forth in claim 14, wherein said carriage assembly includes a carriage having a first guide portion oriented transverse the uprights and a side shiftable frame having a second guide portion oriented substantially parallel with said first guide portion, said side shiftable frame being connected to the carriage and movable along the first guide portion, said first and second forks being connected to said side shiftable frame and movable along said second guide portion.

18. A material handling vehicle, as set forth in claim 17, including:

third detecting means for sensing a location of the side shiftable frame with respect to the carriage and delivering a third signal in response to said side shiftable frame being at a preselected transverse position;

said controlling means includes means for receiving said third signal and producing a third movement signal in response to said third signal and a set of preprogrammed instructions; and third driving means for receiving said third movement signal and responsively moving said side shiftable frame to a predetermined position relative to said carriage as set forth by said preprogrammed instructions.

19. A material handling vehicle, as set forth in claim 14, including fourth detecting means for sensing vertical edges of a load opening and responsively producing fourth and fifth signals, respectively, and wherein said controlling means includes means for receiving said fourth and fifth signals, and for positioning said first and second forks relative to said load opening.

20. A material handling vehicle having a frame and a lift mast assembly, said lift mast assembly having a pair of spaced apart uprights connected to the frame, a carriage assembly connected to the uprights and movable along the uprights, first and second forks connected to the carriage assembly and movable relative the carriage assembly transverse the uprights, said carriage assembly includes a carriage having a first guide portion oriented transverse the uprights and a side shiftable frame having a second guide portion oriented substantially parallel with said first guide portion, said side shiftable frame being connected to the carriage and movable along the first guide portion, said first and second forks being connected to said side shiftable frame and movable along said second guide portion, comprising:

first detecting means for sensing a transverse location of the first fork relative to the side shiftable frame and producing a first signal in response to said location of the first fork;

second detecting means for sensing a transverse location of the second fork relative to the side shiftable frame and producing a second signal in response to said location of the second fork;

third detecting means for sensing a location of the side shiftable frame with respect to the carriage and delivering a third signal in response to said side shiftable frame being at a preselected transverse position;

controlling means for receiving the first, second, and third signals and for producing first, second, and third movement signals in response to said receive signals and a set of preprogrammed instructions;

first driving means for receiving said first movement signal and responsively moving the first fork to a predetermined position relative the side shiftable frame as set forth by said preprogrammed instructions;

second driving means for receiving said second movement signal and responsively moving the second fork relative the side shiftable frame as set forth by said preprogrammed instructions; and, third driving means for receiving said third movement signal and responsively moving said side shiftable frame to a predetermined position relative to said carriage as set forth by said preprogrammed instructions.

* * * * *